Patented Aug. 25, 1936

2,052,210

UNITED STATES PATENT OFFICE 2,052,210

SULPHUR-CONTAINING ABIETYL COMPOUNDS AND METHOD OF PRODUCING

Joseph N. Borglin, Wilmington, and Emil Ott, Elsmere, Del., assignors to Hercules Powder Company, Wilmington, Del., a corporation of Delaware No Drawing. Application February 24, 1934, Serial No. 712,753

23 Claims. (Cl. 260—16)

This invention relates to abietyl mercaptans and sulphides and to methods for their production.

In accordance with this invention, it has been found possible to effect a reaction between unsaturated abietyl compounds and hydrogen sulphide resulting in the formation of abietyl mercaptans and sulphides.

The reaction in accordance with this invention involves the addition of hydrogen sulphide at the unsaturated bonds of the abietyl compound with the resultant formation, according to the conditions of reaction, of mercaptans or sulphides. Mono-mercaptans will be formed by simple combination between one molecule of hydrogen sulphide and one molecule of unsaturated abietyl compound, while by the interaction of several molecules of each reactant or by the reaction of the mercaptan first formed with itself or with the unsaturated abietyl compound present various sulphides or thioethers may be formed. In the presence of any oxidizing agent, as for example, air, the mercaptans will also be converted into di- or polysulphide. The addition of hydrogen sulphide to more than one double bond will result in the formation of polymercaptans.

The unsaturated abietyl compound, which may be, for example, rosin (abietic acid), rosin esters, rosin oil (abietene, abietine), abietyl alcohol, etc., will be treated with hydrogen sulphide under suitable conditions. The abietyl compound may be dissolved in a non-reactive solvent, as for example, benzene, toluene, gasoline, butanol, etc., or, if liquid at the temperature employed, may be used without a solvent. Hydrogen sulphide will then be passed through the liquid or solution until the reaction is substantially completed, for example, for a period varying from 6 to 72 hours depending upon the conditions of reaction. The use of any particular temperature is not essential to the reaction, but too low a temperature will decrease the rate of reaction unduly, while too high a temperature will tend to cause decomposition of the reaction product. A temperature range of from about 0° C. to about 300° C. is suitable for the reaction although a range of from about 40° C. to 200° C. is preferred. The reaction will progress at any pressure, but the use of superatmospheric pressure is preferred because of the increased rate of reaction and yield of product so obtained. The pressure may accordingly vary from about atmospheric to about 100 atmospheres, although these limits are in no way critical.

The abietyl compounds need not be in the form of pure compounds in order to be treated in accordance with this invention for the production of mercaptans and sulphides, but may be reacted in a crude form. Thus, in place of abietic acid, rosin, either gum or wood rosin, refined or unrefined, may be used. And crude rosin oil resulting from the destructive distillation of rosin may be used as a source of abietyl hydrocarbons such as abietene and abietine without the necessity of further purification.

Desirably a catalyst will be employed to promote the reaction, although it is to be understood that the use of catalysts is not essential. Suitable catalysts include, for example, acids, such as sulphuric acid, phosphoric acid, acetic acid, etc.; or their anhydrides, as phosphorus pentoxide etc.; bases such as potassium hydroxide, calcium hydroxide, mono-amylamine, diamylamine, triamylamine, ethanolamines, analine, pyridine, etc.; contact catalysts, such as, activated carbon, silica gel, etc.; dimethyl sulphate; metallic aluminum; and metal sulphides. A combination of catalysts, for example, phosphoric acid and silica gel, is often more effective than single catalysts. Preferably bases will be used as catalysts in the reaction according to this invention, since they are most effective.

The catalyst will desirably be used in an amount about five times that of the abietyl compound, although more or less can be used if desired. Smaller amounts of catalysts than this will tend to reduce the rate and yield, while larger amounts will not substantially increase either the rate or yield.

The mineral acid catalysts will desirably be employed in concentrations of from 5 to 100%. For example, sulphuric acid in concentration of 5 to 90% is effective, and phosphoric acid may be used in concentration of from 10 to 98%. These acid catalysts lose much of their activity after having once been used in the reaction, but the activity may be restored by adding a small amount of anhydrous or concentrated acid to the spent acid. Reactivation can also be accomplished by heating the spent acid catalyst to about 80° C.–120° C. for about an hour, cooling, and filtering through activated charcoal.

If it is desired to produce abietyl mercaptans unmixed with abietyl polysulphides, it is necessary to exclude air or other oxidizing substances from the reaction mass in order to avoid oxidation of the mercaptans as formed. The same result may be accomplished by adding an antioxidant, as for example, hydroquinone, pyrogallol, etc., to the reaction mixture. The presence of the anti-oxidant will also tend to prevent oxidation of the mercaptan after formation and during storage, shipment, etc.

On the other hand, if it is desired to produce abietyl polysulphides, the abietyl mercaptans may be oxidized to polysulphides as they are formed by introducing air or oxygen to the reaction zone along with the hydrogen sulphide or independently, or by other known means.

It will be understood accordingly that all examples given for the production of abietyl mercaptans will serve likewise for the production of the corresponding abietyl polysulphides, it being only necessary to supply air or oxygen to the reaction mixture.

No special form of apparatus is required to carry out the reaction in accordance with this invention. When atmospheric pressure is used, the reaction may be carried out in an open vessel; while reaction under superatmospheric pressure will be carried out in, for example, an autoclave.

The procedure in accordance with this invention for the production of abietyl mercaptans and polysulphides is illustrated by the following examples:

*Example I*

30 g. wood rosin dissolved in 15 cc. of butanol and 30 cc. toluene, and 125 cc. of 85% phosphoric acid were contacted in the absence of air with hydrogen sulphide, at atmospheric pressure, for twenty-four hours. The temperature will rise somewhat above room temperature during the first few hours of the reaction. The two layers were allowed to separate; the upper one, comprising a solution of rosin mercaptan, was drawn off, water washed and the solvents evaporated under reduced pressure. The product, comprising rosin mercaptain and unreacted rosin, analyzed as follows:

Acid number _____ 174.5
Sulphur _____ 1.8%
Color _____ G
R. I. @ 20° C. _____ 1.5467
Mercaptan _____ 18.9%

*Example II*

10 parts by weight of rosin and 50 parts by volume of triethanolamine were maintained at a temperature of 80° C. and H$_2$S mixed with CO$_2$ passed in during 72 hours. The product was recovered by dissolving it in benzene, adding sufficient water to cause separation into two layers, and washing the resulting benzene rosin mercaptan solution further with water to remove residual free H$_2$S. The benzene was removed by evaporating under reduced pressure. The product analyzed 3.1% sulphur, equivalent to a 32.6% yield of mercaptan.

*Example III*

10 parts by weight of rosin, 15 parts by volume of benzene, 100 parts by volume of 85% phosphoric acid and 0.5 part by weight of activated carbon were placed in an autoclave. The autoclave and contents were cooled to 0° C. and saturated with H$_2$S at 0° C. The autoclave was rotated to get contact between the reactants. The temperature of the autoclave and contents was raised to 80° C. The gauge pressure was maintained at 300–350# per square inch. The time of contact was twenty-four hours. The reactants were then poured into a suitable vessel and allowed to separate. The upper, benzene solution of the product was water washed and evaporated to recover the product. This product analyzed 4.3% sulphur (45.2% mercaptan).

In all the examples the mercaptan content is that calculated from the sulphur content on the assumption that no side reactions took place.

The abietyl mercaptans and sulphides in accordance with this invention may be used as flotation agents in the flotation refining of ores, or they may be used as raw materials for the production of the corresponding sulphonic acids, trithiocarbonates, etc., which are of value as wetting out agents, flotation agents, etc. If the mercaptans and sulfides are desired in greater purity than as directly produced in the above examples, the crude products may be refined by extraction, etc.

The term "abietyl" as used heretofore and in the claims hereinafter set forth characterizes compounds containing structurally the carbon skeleton found in abietane, the parent saturated hydrocarbon.

What we claim and desire to protect by Letters Patent is:

1. An abietyl mercaptan.
2. Abietic acid mercaptan.
3. The reaction product of an unsaturated abietyl compound and hydrogen sulphide.
4. The reaction product of abietic acid and hydrogen sulphide.
5. The method of producing an abietyl mercaptan which includes reacting an unsaturated abietyl compound with hydrogen sulphide under non-oxidizing conditions.
6. The method of producing a sulphur-containing abietyl compound which includes reacting an unsaturated abietyl compound with hydrogen sulphide in the presence of a catalyst selected from the group consisting of acidic catalysts, basic catalysts, contact catalysts, dimethyl sulphate, metallic aluminum and metal sulphides.
7. The method of producing a sulphur-containing abietyl compound which includes heating an unsaturated abietyl compound with hydrogen sulphide at a temperature adapted to promote the reaction.
8. The method of producing a sulphur-containing abietyl compound which includes heating an unsaturated abietyl compound with hydrogen sulphide at a temperature adapted to promote the reaction and in the presence of a catalyst selected from the group consisting of acidic catalysts, basic catalysts, contact catalysts, dimethyl sulphate, metallic aluminum and metal sulphides.
9. The method of producing a sulphur-containing abietyl compound which includes reacting an unsaturated abietyl compound with hydrogen sulphide under pressure.
10. The method of producing a sulphur-containing abietyl compound which includes heating an unsaturated abietyl compound with hydrogen sulphide at a temperature of from about 0° C. to about 300° C.
11. The method of producing a sulphur-containing abietyl compound which includes reacting an unsaturated abietyl compound with hydrogen sulphide in the presence of a base.
12. The method of producing a sulphur-containing abietyl compound which includes heating an unsaturated abietyl compound with hydrogen sulphide at a temperature adapted to promote the reaction and in the presence of a base.
13. An abietyl sulphide.
14. An abietyl polysulphide.

15. The method of producing a sulphur-containing abietyl compound which includes reacting an unsaturated abietyl compound with hydrogen sulphide.

16. The method of producing an abietyl polysulphide which includes reacting an unsaturated abietyl compound with hydrogen sulphide in the presence of oxygen.

17. The method of producing a sulphur-containing abietyl compound which includes reacting an unsaturated abietyl compound with hydrogen sulphide in the presence of an acid.

18. A reaction product of an unsaturated abietyl compound and hydrogen sulphide comprising a mixture of an abietyl mercaptan and an abietyl sulphide.

19. The method of producing an abietyl mercaptan which includes reacting an unsaturated abietyl compound with hydrogen sulphide in the presence of an anti-oxidant.

20. The method of producing a sulphur-containing abietyl compound which includes treating an unsaturated abietyl compound, in solution in a solvent therefor which is non-reactive with hydrogen sulphide, with hydrogen sulphide at a temperature adapted to promote the reaction.

21. The method of producing a sulphur-containing abietyl compound which includes reacting an unsaturated abietyl compound with hydrogen sulphide in the presence of phosphoric acid.

22. The method of producing a sulphur-containing abietyl compound which includes reacting an unsaturated abietyl compound with hydrogen sulphide in the presence of an ethanolamine.

23. The method of producing a sulphur-containing abietyl compound which includes reacting an unsaturated abietyl compound with hydrogen sulphide in the presence of analine.

JOSEPH N. BORGLIN.
EMIL OTT.